United States Patent
Ratra et al.

(10) Patent No.: US 9,817,592 B1
(45) Date of Patent: Nov. 14, 2017

(54) USING AN INTERMEDIATE VIRTUAL DISK FORMAT FOR VIRTUAL DISK CONVERSION

(71) Applicant: NetApp, Inc., Sunnyvale, CA (US)

(72) Inventors: Sunny Ratra, Sunnyvale, CA (US);
Sungwook Ryu, Sunnyvale, CA (US);
Steven Beam, Durham, NC (US);
Shweta Behere, Sunnyvale, CA (US);
Sreenivasa Potakamuri, Sunnyvale, CA (US); Seema Kamat, Sunnyvale, CA (US); Ben de Waal, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 73 days.

(21) Appl. No.: 15/140,372

(22) Filed: Apr. 27, 2016

(51) Int. Cl.
G06F 9/455 (2006.01)
G06F 3/06 (2006.01)

(52) U.S. Cl.
CPC ............ *G06F 3/0619* (2013.01); *G06F 3/065* (2013.01); *G06F 3/0647* (2013.01); *G06F 3/0661* (2013.01); *G06F 3/0664* (2013.01); *G06F 3/0689* (2013.01); *G06F 9/45558* (2013.01); *G06F 2009/45583* (2013.01)

(58) Field of Classification Search
None
See application file for complete search history.

(56) References Cited

U.S. PATENT DOCUMENTS

| | | |
|---|---|---|
| 5,710,917 A | 1/1998 | Musa et al. |
| 5,819,292 A | 10/1998 | Hitz et al. |
| 6,131,192 A | 10/2000 | Henry |
| 6,857,001 B2 | 2/2005 | Hitz et al. |
| 7,107,385 B2 | 9/2006 | Rajan et al. |
| 7,409,494 B2 | 8/2008 | Edwards et al. |
| 7,577,722 B1 | 8/2009 | Khandekar et al. |
| 7,933,872 B2 | 4/2011 | Kulkarni et al. |
| 8,041,888 B2 | 10/2011 | Rajan et al. |
| 8,281,066 B1 | 10/2012 | Trimmer et al. |
| 8,332,847 B1 | 12/2012 | Hyser et al. |
| 8,352,608 B1 | 1/2013 | Keagy et al. |
| 8,386,838 B1 | 2/2013 | Byan |
| 8,417,938 B1 | 4/2013 | Considine et al. |
| 8,458,717 B1 | 6/2013 | Keagy et al. |
| 8,688,636 B1 | 4/2014 | Barve |
| 8,825,940 B1 | 9/2014 | Diggs |
| 8,826,033 B1 | 9/2014 | Krishnaprasad et al. |
| 9,146,769 B1 | 9/2015 | Shankar et al. |

(Continued)

OTHER PUBLICATIONS

Non-final Office Action dated Mar. 10, 2017 for U.S. Appl. No. 14/530,135.

(Continued)

*Primary Examiner* — Kaushikkumar Patel (74) *Attorney, Agent, or Firm* — Klein, O'Neill & Singh, LLP (57) ABSTRACT

A virtual disk conversion system determines location ranges for data on a storage device that are found in files representing a virtual disk in a source format. An intermediate virtual disk data structure containing the location ranges for the data is generated, and the intermediate virtual disk data structure is used to associate data at the location ranges with a new file on the storage device that represents a virtual disk in a destination format.

21 Claims, 6 Drawing Sheets

(56) References Cited

U.S. PATENT DOCUMENTS

| | | |
|---|---|---|
| 9,177,337 B2 | 11/2015 | Hing |
| 2005/0216532 A1 | 9/2005 | Lallier |
| 2006/0089992 A1 | 4/2006 | Blaho |
| 2007/0171921 A1 | 7/2007 | Wookey et al. |
| 2007/0220248 A1 | 9/2007 | Bittlingmayer et al. |
| 2008/0235238 A1 | 9/2008 | Jalobeanu et al. |
| 2008/0263258 A1* | 10/2008 | Allwell ............... G06F 9/461 711/6 |
| 2009/0172664 A1 | 7/2009 | Mostafa |
| 2009/0228629 A1 | 9/2009 | Gebhart et al. |
| 2010/0070725 A1* | 3/2010 | Prahlad ............ G06F 11/1453 711/162 |
| 2010/0250630 A1 | 9/2010 | Kudo |
| 2010/0257269 A1 | 10/2010 | Clark |
| 2010/0281467 A1 | 11/2010 | Arteaga et al. |
| 2010/0293349 A1 | 11/2010 | Lionetti et al. |
| 2011/0022694 A1 | 1/2011 | Dalal et al. |
| 2011/0078395 A1 | 3/2011 | Okada et al. |
| 2011/0107330 A1* | 5/2011 | Freundlich ......... G06F 9/45558 718/1 |
| 2011/0126269 A1 | 5/2011 | Youngworth |
| 2011/0131524 A1 | 6/2011 | Chang et al. |
| 2011/0131576 A1 | 6/2011 | Ikegaya et al. |
| 2011/0307889 A1 | 12/2011 | Moriki et al. |
| 2012/0011193 A1 | 1/2012 | Gilboa |
| 2012/0011280 A1 | 1/2012 | Gilboa |
| 2012/0011445 A1 | 1/2012 | Gilboa |
| 2012/0030669 A1 | 2/2012 | Tsirkin |
| 2012/0110574 A1 | 5/2012 | Kumar |
| 2012/0144391 A1 | 6/2012 | Ueda |
| 2012/0151476 A1 | 6/2012 | Vincent |
| 2012/0197772 A1 | 8/2012 | Hing |
| 2012/0221699 A1 | 8/2012 | Moriyasu et al. |
| 2012/0233282 A1 | 9/2012 | Voccio et al. |
| 2012/0278804 A1 | 11/2012 | Narayanasamy et al. |
| 2013/0014102 A1* | 1/2013 | Shah .................. G06F 9/45558 718/1 |
| 2013/0024722 A1 | 1/2013 | Kotagiri et al. |
| 2013/0139153 A1 | 5/2013 | Shah |
| 2013/0139155 A1 | 5/2013 | Shah |
| 2013/0151802 A1* | 6/2013 | Bahadure ............ G06F 3/0605 711/162 |
| 2013/0152078 A1 | 6/2013 | Arcilla et al. |
| 2013/0166504 A1 | 6/2013 | Varkhedi et al. |
| 2013/0185715 A1 | 7/2013 | Dunning et al. |
| 2013/0232474 A1 | 9/2013 | Leclair et al. |
| 2013/0247136 A1 | 9/2013 | Chieu et al. |
| 2013/0275596 A1 | 10/2013 | Subramaniam |
| 2013/0275971 A1 | 10/2013 | Kruglick |
| 2013/0326505 A1 | 12/2013 | Shah |
| 2013/0339645 A1* | 12/2013 | Barve .................. G06F 3/065 711/162 |
| 2013/0339956 A1 | 12/2013 | Murase et al. |
| 2013/0343385 A1* | 12/2013 | Benny ................... H04L 45/64 370/392 |
| 2014/0007092 A1 | 1/2014 | Barbee et al. |
| 2014/0007093 A1 | 1/2014 | Deshpande et al. |
| 2014/0032753 A1 | 1/2014 | Watanabe et al. |
| 2014/0075437 A1 | 3/2014 | Mousseau |
| 2014/0137114 A1 | 5/2014 | Bolte et al. |
| 2014/0149983 A1 | 5/2014 | Bonilla et al. |
| 2014/0165063 A1 | 6/2014 | Shiva et al. |
| 2014/0172406 A1 | 6/2014 | Baset et al. |
| 2014/0196030 A1 | 7/2014 | Deshpande et al. |
| 2014/0201732 A1 | 7/2014 | Haag et al. |
| 2014/0223435 A1 | 8/2014 | Chang |
| 2014/0245292 A1 | 8/2014 | Balani et al. |
| 2014/0281217 A1* | 9/2014 | Beam ................... G06F 3/0617 711/114 |
| 2014/0282519 A1* | 9/2014 | Apte .................. G06F 9/45533 718/1 |
| 2014/0344807 A1 | 11/2014 | Bursell et al. |
| 2014/0359610 A1 | 12/2014 | Tian et al. |
| 2015/0052521 A1 | 2/2015 | Raghu |
| 2015/0058382 A1* | 2/2015 | St. Laurent ....... G06F 17/30076 707/823 |
| 2015/0106809 A1 | 4/2015 | Reddy et al. |
| 2015/0109923 A1 | 4/2015 | Hwang |
| 2015/0113530 A1 | 4/2015 | Arcese et al. |
| 2015/0113531 A1 | 4/2015 | Lv et al. |
| 2015/0134615 A1 | 5/2015 | Goodman et al. |
| 2015/0140974 A1 | 5/2015 | Liimatainen |
| 2015/0154039 A1 | 6/2015 | Zada et al. |
| 2015/0178113 A1 | 6/2015 | Dake |
| 2015/0178128 A1 | 6/2015 | Knowles et al. |
| 2015/0242225 A1 | 8/2015 | Muller et al. |
| 2015/0254256 A1 | 9/2015 | St. Laurent et al. |
| 2015/0324216 A1 | 11/2015 | Sizemore et al. |
| 2015/0324217 A1 | 11/2015 | Shilmover et al. |
| 2015/0324227 A1 | 11/2015 | Sizemore |
| 2016/0019087 A1 | 1/2016 | Hing |
| 2016/0070623 A1* | 3/2016 | Derk ................... G06F 11/1469 714/6.23 |
| 2016/0132400 A1* | 5/2016 | Pawar ................. G06F 11/1458 707/679 |
| 2016/0241573 A1 | 8/2016 | Mixer |
| 2017/0168903 A1* | 6/2017 | Dornemann ........ G06F 11/1469 |

OTHER PUBLICATIONS

Final Office Action dated May 4, 2017 for U.S. Appl. No. 14/503,338.
John J., "Top Three Things to Know Before you Migrate to Clustered Data ONTAP," Jul. 23, 2013, 5 pages.
Non-Final Office Action on co-pending U.S. Appl. No. 14/814,828 dated Jul. 13, 2016.
Notice of Allowance on co-pending U.S. Appl. No. 14/814,828 dated Feb. 1, 2017.
Non-Final Office Action on co-pending U.S. Appl. No. 14/712,845 dated Sep. 2, 2016.
Final Office Action on co-pending U.S. Appl. No. 14/712,845 dated Jan. 26, 2017.
Non-Final Office Action on co-pending U.S. Appl. No. 14/870,095 dated Oct. 25, 2016.
Notice of Allowance on co-pending U.S. Appl. No. 14/296,695 dated Jul. 25, 2017.
Final Office Action on co-pending U.S. Appl. No. 14/870,095 dated Jun. 1, 2017.
Non-Final Office Action on co-pending U.S. Appl. No. 14/928,158 dated Jun. 8, 2017.
Alvarez., et al., "Back to Basics: FlexClone", Tech On Tap, Apr. 2011, 12 pages.
Bolosky W.J., et al., "Single Instance Storage in Windows 2000," Microsoft Corporation, [retrieved on May 2, 2011], URL: http://citeseerx.ist.psu.edu/viewdoc/download?doi=10.1.1.67.5656 &rep=rep1- &type=pdf, Aug. 2000, 12 pages.
Feresten., et al., "Back to Basics: NetApp Thin Provisioning", Tech On Tap, Oct. 2011, 8 pages.
Notice of Allowance on co-pending U.S. Appl. No. 14/530,135 dated Aug. 4, 2017.
Final Office Action dated Aug. 11, 2016 for U.S. Appl. No. 14/296,695, filed Jun. 5, 2015, 43 pages.
Final Office Action dated Mar. 15, 2016 for U.S. Appl. No. 13/796,010, filed Mar. 12, 2013, 14 pages.
Microsoft Virtual Hard Disk Image Format Specification 1.0, Oct. 11, 2006, 17 pages.
Non-final Office Action dated Aug. 13, 2015 for U.S. Appl. No. 14/296,695, filed Jun. 5, 2015, 21 pages.
Non-final Office Action dated Feb. 9, 2016, for U.S. Appl. No. 14/296,695, filed Jun. 5, 2015, 26 pages.
Non-final Office Action dated Jun. 30, 2016 for U.S. Appl. No. 13/796,010, filed Mar. 12, 2013, 14 pages.
Non-Final Office Action dated Oct. 6, 2016 for U.S. Appl. No. 14/503,338, filed Sep. 30, 2014, 19 pages.
Non-final Office Action dated Sep. 11, 2015 for U.S. Appl. No. 13/796,010, filed Mar. 12, 2013, 12 pages.
Notice of Allowance dated Dec. 19, 2016 for U.S. Appl. No. 13/796,010, filed Mar. 12, 2013, 22 pages.

(56) References Cited

OTHER PUBLICATIONS

Whitehouse L., et al., "Amazon Web Services: Enabling Cost-Efficient Disaster Recovery Leveraging Cloud Infrastructure", Enterprise Strategy Group, White Paper, Jan. 2012, 16 pages.
Robinson G., et al., "Using Amazon Web Services for Disaster Recovery," Amazon Web Services, Oct. 2014, 22 pages, retrieved on Nov. 3, 2016.

\* cited by examiner

USING AN INTERMEDIATE VIRTUAL DISK FORMAT FOR VIRTUAL DISK CONVERSION

TECHNICAL FIELD

Examples described herein relate to virtual machines, and more specifically, to a system and method for using an intermediate virtual disk format for virtual disk conversion.

BACKGROUND

A virtual machine (VM) is a software implementation of a machine (for example, a computer) that executes programs like a physical machine. System virtual machines provide a complete substitute for the targeted real machine and a level of functionality required for the execution of a complete operating system. A virtual machine manager known as a hypervisor uses native execution to share and manage hardware, which allows multiple different guest operating systems, isolated from each other, to be executed on the same physical machine. Modern hypervisors use hardware-assisted virtualization, which provides efficient and full virtualization by using virtualization-specific hardware capabilities, primarily from the host CPUs.

A virtual hard disk, or simply a virtual disk, is a disk image file or files that appear as a physical disk drive to a guest operating system. These vdisks store the contents of the virtual machine's hard disk drive and can be stored anywhere the physical host can access. Virtual disks come in various formats, which are typically specific to a vendor or hypervisor, and new incompatible formats are constantly created.

Enterprises today have complex environments with hypervisors from multiple vendors, and reliable migration of virtual machines across hypervisor platforms is a complicated and time-consuming task.

DETAILED DESCRIPTION

Due to the competition in various virtual machine manager, or hypervisor, platforms in terms of features, cost, and scalability in modern virtualization solutions, there is a need to migrate virtual machines (VMs) from one hypervisor platform to another. Enterprises do not want to be tied to a single hypervisor vendor, and customers desire the flexibility to move their VMs whenever they want and wherever they want. Conventional VM conversion tools are costly, can take many days for conversion, and require long downtimes where the VM is unavailable for use. Conversion times in conventional tools are also dependent on the size of the VM, which means that larger VMs can take an excessively long time to convert. In addition, some conventional tools require the VM to be moved to the conversion platform to perform the conversions. Customers usually have very short maintenance windows to perform conversions so there is a need for a viable and reliable solution to easily and efficiently convert VMs from one hypervisor to another.

Currently there are many types of virtual disk (vdisk) formats for virtual machines in the industry (e.g., VMDK, VHDX, QCOW2) with new formats being developed constantly. These vdisks store the contents of the virtual machine's hard disk drive and have two parts: a header section and a data section, or payload. The arrangement and contents of the header is different for each type of vdisk, but the header is generally small. The data, on the other hand, occupies more storage space, but the data is a sequence of bytes that does not depend on the type of vdisk. That is, the data is common between the equivalent vdisks in different hypervisor formats. However, the layouts of the data section can be different and depend on the type of vdisk format.

Converting the vdisk headers directly between formats requires exponentially more effort as new formats are added. By introducing an intermediate vdisk format, a virtual disk conversion system can reduce the overhead of supporting conversions between any number of formats. To reduce the problem space of converting one arbitrary virtual disk format to another, a virtual disk conversion system can define an intermediate data structure to represent the virtual disk's data blocks on the storage system. This intermediate representation contains enough information to reconstruct the data blocks of the source virtual disk on a prepared destination virtual disk.

In some aspects, converting a virtual machine from one format to provision a new virtual machine in a different format can be performed without copying the underlying data in the virtual disk. Conventional VM provisioning requires a full copy, which can take 20 to 30 minutes to complete for a VM of modest size, depending on the hardware used. Among other benefits, example virtual disk conversion systems can leave the original data intact on storage devices so that virtual machines can be provisioned much faster. In addition, the source virtual disk files can remain intact after the destination files are created. Examples provide a method and system to quickly perform space and time-efficient virtual machine conversions, without physically copying virtual disk data.

In an example, a virtual disk conversion system determines location ranges for data on a storage device that are found in files representing a virtual disk in a source format. An intermediate virtual disk data structure containing the location ranges for the data is generated, and the intermediate virtual disk data structure is used to associate data at the location ranges with a new file on the storage device that represents a virtual disk in a destination format.

In generating the intermediate virtual disk data structure, the virtual disk conversion system can use a source template to parse the source file(s) that represent the source virtual disk and map file offsets and sizes in the source file to the location ranges for the data. Additional metadata for the source virtual disk can also be stored in the intermediate virtual disk data structure. In addition, the source template can be used to determine the location ranges for the data on the storage device.

According to some examples, the virtual disk conversion system uses a destination template and additional metadata from the intermediate virtual disk data structure to generate the destination file(s) on the storage device. The virtual disk conversion system can also perform data cloning operations to associate the data location ranges with the destination file without copying the data located on the storage device.

In some aspects, the virtual disk conversion system can perform operations using multiple templates and the intermediate virtual disk data structure to associate the data ranges with multiple destination virtual disks in any number of formats.

In some examples, each of the location ranges for the data includes a logical block address on the storage device and a data size. Furthermore, the storage device can be a single physical drive, a subset of a physical drive, or a combination of drives such as in a RAID array.

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Furthermore, one or more aspects described herein may be implemented through the use of instructions that are executable by one or more processors. These instructions may be carried on a computer-readable medium. Machines shown or described with figures below provide examples of processing resources and computer-readable media on which instructions for implementing some aspects can be carried and/or executed. In particular, the numerous machines shown in some examples include processor(s) and various forms of memory for holding data and instructions. Examples of computer-readable media include permanent memory storage devices, such as hard drives on personal computers or servers. Other examples of computer storage media include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable media.

Alternatively, one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. All the processing is performed by interconnected gates.

System Overview

Figure 1:
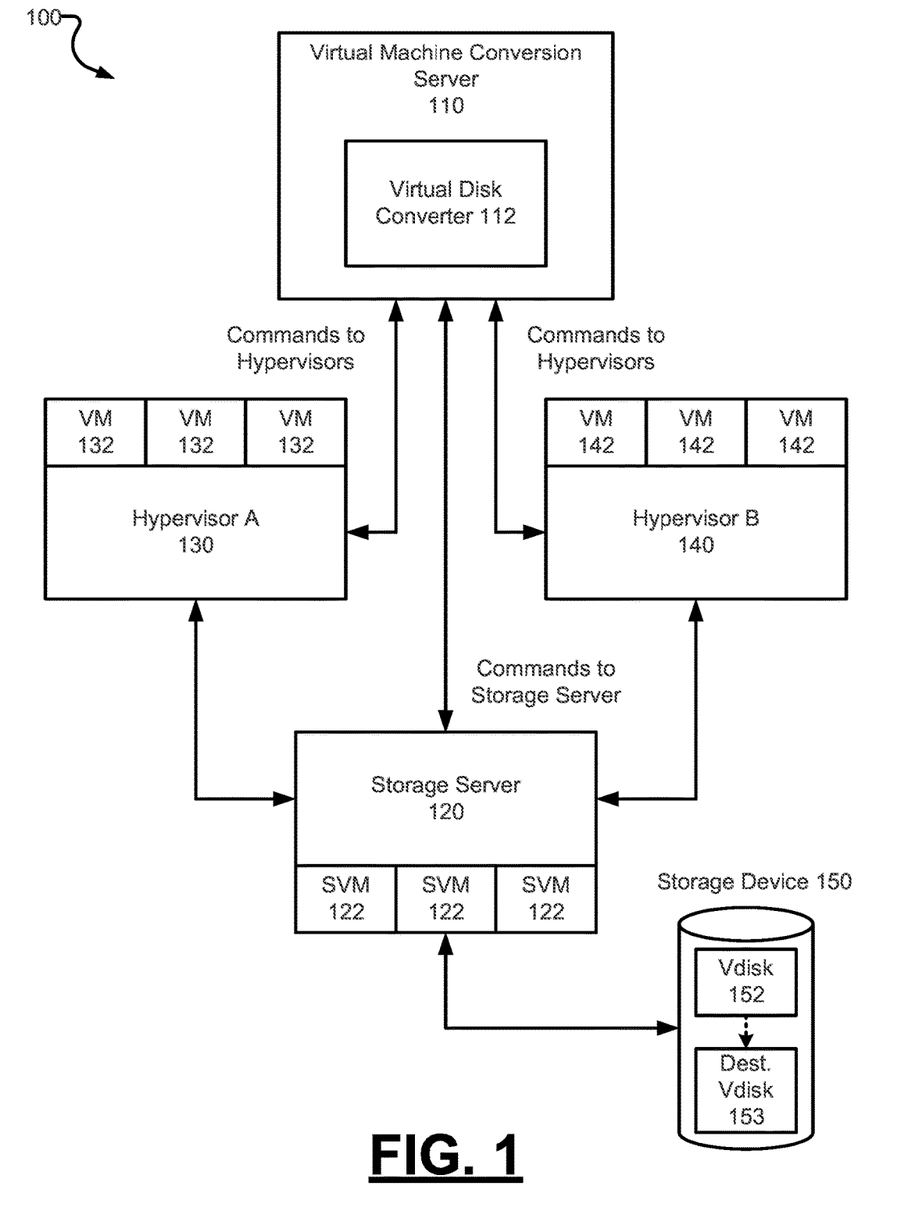
FIG. 1 illustrates an example system for using an intermediate virtual disk format for virtual disk conversion, in accordance with some aspects.

FIG. 1 illustrates an example virtual machine conversion system 100 for using an intermediate virtual disk format for virtual disk conversion, in accordance with some aspects. The virtual machine conversion system 100 includes a virtual machine conversion server 110, storage server 120 connected to a storage device 150, and at least two hypervisor environments 130, 140 running virtual machines 132, 142 with different virtual disk formats. Virtual disks, such as vdisk 152 and destination vdisk 153 on the storage device 150, store the contents of hard drives for virtual machines 132, 142. A virtual disk converter 112 running on the VM conversion server 110 determines where data associated with vdisk 152 is located on the storage device 150, generates an intermediate data structure storing the locations on the storage device 150 where the data was found, and can then use the intermediate data structure to convert vdisk 152 between virtual disk formats. For example, vdisk 152 may store the contents of a hard drive associated with virtual machine 132 in a format compatible with hypervisor A 130. Virtual disk converter 112 can convert vdisk 152 to a format compatible with hypervisor B 140 and create destination vdisk 153 so that hypervisor B 140 can provision a virtual machine 142 using destination vdisk 153.

The virtual machine conversion server 110 communicates with hypervisor environments 130, 140 and storage server 120 and executes operations to convert virtual machines between hypervisors. The virtual machine conversion server 110 is configured to communicate with the hypervisor environments 130, 140 using their appropriate interfaces. For example, virtual machine conversion server 110 can communicate with hypervisor A 130 through a command line interface and hypervisor B 130 using an automation platform and scripting language module such as a PowerShell module.

In one example, VM conversion server 110 is a standalone physical computing device or a virtual server external to both hypervisor environments 130, 140. In other examples, VM conversion server 110 can be a virtual machine and reside within a hypervisor environment on a host server. Hypervisor environments 130, 140 can divide the computing resources of one or more host servers among virtual machines 132, 142.

In some aspects, virtual machine conversion server 110 uses a representational state transfer application programming interface (RESTful API) as its main communication channel, including for user access. In other aspects, rather than exposing the RESTful API to user/client access, virtual machine conversion server 110 can provide a PowerShell graphical user interface or cmdlet for interacting with the virtual machine conversion server 110. A user may enter commands directly into a client program running the graphical user interface, or a user may connect to the virtual machine conversion server 110 over a network. The virtual machine conversion server virtual machine conversion server 110, hypervisor environments 130, 140, and storage server 120 can each be connected over one or more networks or physically located at the same site. As a result, a virtual machine conversion system 100 can describe remote or cloud computing environments over public networks such as the Internet as well as environments where the hardware devices are locally networked.

The virtual machine conversion server 110 can provide a configuration wizard that can be initiated to perform configuration of the virtual machine conversion server 110. The server configuration steps include configuring the hypervisors, guest operating system (GOS) on VMs 132, 142, setting up storage server 120, providing network mappings, providing destination path settings, security credentials for the hypervisors and storage server 120, etc. The wizard can also provide options to set up and configure remote management features and create any storage virtual machine (SVM) 122 necessary for virtual disk conversion. In some examples, virtual machine conversion server 110 includes PowerShell cmdlets for all of the configuration and conversion operations, allowing for one common management framework. Virtual machine conversion server 110 can store the configuration information in XML files, a database, or any other appropriate format.

In some aspects, virtual machine conversion server 110 supports a job queue. When a user submits a conversion job, the job is queued in the job queue and processed in order of submission. The virtual machine conversion server 110 communicates details of the conversion job to hypervisors and the storage server 120 to create new destination virtual disks and provision a new VM. Once one conversion job is complete, the job queue can proceed to the next conversion job. Users can submit jobs to have virtual disk converter 112 convert vdisk 152 to a new format and provision a VM 142 for the destination vdisk 153 in a one-to-one operation. Alternatively, virtual disk converter 112 can convert vdisk 152 in a one-to-many operation, resulting in multiple virtual disks and provisioned virtual machines, which can be in differing formats.

In addition to converting virtual disks in response to a user-initiated conversion job, the virtual machine conversion server 110 can convert vdisk 152 into an intermediate data structure and back it up to a remote site or to backup media. As a separate operation or part of a disaster recovery plan, the virtual machine conversion server 110 can later use the backed up intermediate data structure to convert vdisk 152 to another format independent of the original cloud provider's virtual machine or virtual disk format. For example, a cloud service utilizing vdisk 152 in a VMDK format can be converted to destination vdisk 153 in a VHDX format for a different cloud service in response to a disaster event.

A storage virtual machine (SVM) 122 is a logical storage server that provides data access to logical units (accessed through logical unit numbers, or LUNs) and the Network Attached Storage (NAS) namespace from one or more logical interfaces (LIFs). In some aspects, virtual machine conversion server 110 communicates with an SVM 122 hosted on the storage server 120, and vdisk 152 is moved onto this SVM 152 before virtual disk converter 112 can convert it to a new format.

Figure 2:
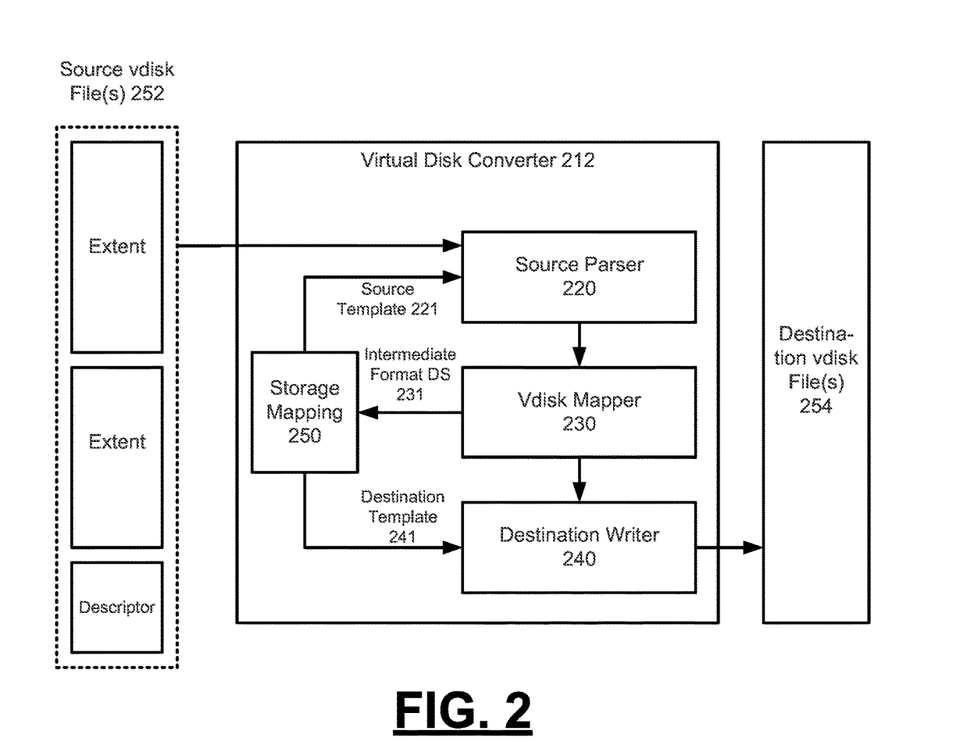
FIG. 2 illustrates an example virtual disk converter, in accordance with some aspects.

FIG. 2 illustrates an example virtual disk converter 212, in accordance with some aspects. With reference to FIG. 1, virtual disk converter 112 running on virtual machine conversion server 110 can represent the virtual disk converter 212, and the vdisk 152 can represent source vdisk file(s) 252.

There are many types of vdisk formats for virtual machines in the industry (e.g., VMDK, VHDX, QCOW2) with new formats being developed on a regular basis. These vdisks store the contents of the virtual machine's hard disk drive and have two parts: a header section and a data section, or payload. The arrangement of the header is different for each type of vdisk, but the header is generally small. The data, on the other hand, occupies more storage space, but the data is a sequence of bytes that does not depend on the type of vdisk. That is, the data is common between the equivalent vdisks in different hypervisor formats. However, the layouts of the data section can be different and depend on the type of vdisk format.

Converting directly between formats requires exponentially more effort as new formats are added because a direction conversion requires a user to know full details regarding the source and destination vdisk formats. For example, supporting conversion between any of 5 different formats would require 20 separate unidirectional conversion implementations. By introducing an intermediate vdisk format, virtual disk converter 212 can reduce the overhead of supporting conversions between any number of formats. To reduce the problem space of converting one arbitrary virtual disk format to another, virtual disk converter 212 can define an intermediate structure to represent the virtual disk's data blocks on the storage system. This intermediate representation contains enough information to reconstruct the data blocks of the source virtual disk on a prepared virtual disk destination. Thus, to convert any new vdisk format to any existing format, virtual disk converter 212 simply needs a template, plugin, or set of instructions to write and read the header of the new vdisk format to and from the intermediate format.

In one example, the source vdisk is a set of VMDK source vdisk files 252. A VMDK consists of multiple files: one descriptor file and one or more extent files. The extent files are flat files that map directly to extents on the virtual disk and therefore make up the data payload for the disk. A vdisk in VMDK format can also be arranged in a single file (e.g., if the total size of the vdisk can be contained within one chunk).

In this example, destination vdisk file 254 can be a VHD or VHDX file. VHDX has a larger maximum virtual disk size and can support disks up to 64 TB. A special log section of the VHDX provides a recovery mechanism to protect against filesystem corruption in the case of an unexpected power failure. The VHDX file can grow dynamically without becoming misaligned on storage systems that use a sector size larger than 512 bytes. To support these advanced features, the VHDX file is broken down into several sections: header, log, metadata, block allocation table (BAT), and data blocks. Each section is aligned to a 1 MB boundary within the VHDX file. The first section is the header, which is always at offset 0 and is always 1 MB in size. The header contains VHDX file identifiers as well as a table indicating the file offsets of the remaining regions in the VHDX file. The log section of the VHDX is used to perform all VHDX metadata updates except the header. If an unexpected power failure occurs before the metadata update has been written to disk, the update can be replayed from the log the next time the file is opened. The metadata section contains both system and user metadata for the VHDX file. System metadata items include the virtual disk size, block size (the size of each payload block in bytes), logical sector size (the size of a sector on the virtual disk), and physical sector size (the size of a sector on the storage system). The block allocation table defines the state and file offset for every block in the virtual disk. Finally, the block sections contain the data payload of the virtual disk. Each data block can be between 1 MB and 256 MB as defined by the block size metadata item.

The goal of the virtual disk converter 212 is to take a virtual disk of a given type (i.e., source vdisk files 252) and create a new virtual disk of another type (i.e., destination vdisk file 254) such that the created vdisk reads the same as the original vdisk. To accomplish this, virtual disk converter 212 parses the source vdisk files 252, maps logical block address (LBA) ranges of the vdisk to file offsets in the source format, and creates an intermediate format data structure 231 that stores the mappings. The virtual disk converter 212 can then create destination vdisk file 254 using the intermediate format data structure 231.

In the example of FIG. 2, source vdisk files 252 are VMDK files that make up a virtual disk in the VMDK format. The virtual disk is separated into two flat file extents and a descriptor file which contains metadata about the virtual disk that allows the hypervisor to expose the virtual disk to the guest operating system. The descriptor file also contains a list of extent descriptors that define the files that contain the data payload.

In some aspects, source parser 220 opens the source vdisk files 252 and determines which format the source vdisk is in. Source parser 220 can determine the format from file extensions or known layouts of vdisk file types. Alternatively, the virtual machine conversion server can specify the type of source vdisk to virtual disk converter 212, which a user creating a conversion job can enter. Source parser 220 uses a source template 221 (i.e., a plugin to the virtual disk converter 212 or a set of parsing instructions for the virtual disk converter 212) to determine the size and location of the data extents from the header of the source vdisk files 252 (e.g., from a VMDK descriptor file). Each data extent represents a location range on a storage device starting at the given location and occupying an amount of storage space equal to the size of the data. In addition, source parser 220 extracts metadata from the source vdisk that is necessary to convert the vdisk into a different format such that the created vdisk reads the same as the original vdisk. Examples of this metadata include the size of the virtual disk, block sizes, and whether the original virtual disk is fully allocated or sparse (i.e., dynamically growing). At this point, virtual disk converter 212 has enough information to create the destination vdisk file 254.

However, rather than directly converting the source vdisk files 252 to the destination vdisk file 254, vdisk mapper 230 can use the parsed data from source parser 220 to create an intermediate format data structure 231 and store it in storage mapping 250 (e.g., a database or file repository). Destination writer 240 can then use a destination template 241 and the intermediate format data structure 231 to create destination vdisk file 254. In this manner, virtual disk converter 212 can convert a source vdisk from any hypervisor format to any other hypervisor format provided that each format has a source template 221 to convert the source vdisk to the intermediate format data structure 231 and/or a destination template 241 to convert the intermediate data structure 231 to the destination vdisk. In addition, virtual disk converter 212 can store and reuse intermediate format data structure 231 to create multiple destination vdisks in differing formats based on the source vdisk.

In some aspects, destination writer 240 creates the destination vdisk file 254 and uses the data mappings from the intermediate format data structure 231 to clone data blocks from the source vdisk files 252 to the destination vdisk file 254. In the example of FIG. 2, destination writer 240 clones data blocks from a VMDK format source vdisk to a VHDX format destination vdisk using one or more sub-file clone operations performed on the file system of the storage device at the storage server. A sub-file clone operation consists of one or more clone ranges that map a source file offset to a destination file offset with a given size. In this example, two clone requests are constructed—one for each VMDK extent in the source vdisk files 252. In addition, destination writer 240 uses a destination template 241 to write the header section of the destination vdisk file 254 and modify the data section layout to conform to the destination format. Modifying the data section layout can involve rearranging the location of the data blocks from the source vdisk files 252 to the destination vdisk file 254.

In other aspects, the source parser 220 can convert allocated data blocks from the source vdisk file(s) 252 to a common format as part of the intermediate format data structure 231. The destination writer 240 can use the intermediate format data structure 231 to create the destination vdisk file(s) 254 and allocate the data blocks using the common format. Through a generic algorithm, the destination writer 240 can then clone the source data to their destinations. In order to improve efficiency, source parser 220 can identify used data blocks in the source vdisk file(s) 252 and only convert or map the used blocks to the common format. When dealing with source vdisk formats that fully allocate data on creation, the source parser 220 can perform operations to punch holes in the source vdisk files 252. That is, allocated but unused portions of the source vdisk files 252 can be removed and only used portions converted to the common format.

The intermediate disk format can be used for any storage vendors, and it can also be used for any virtual disk formats (e.g., VHDX, VMDK, QCOW2). In some examples, virtual disk converter 212 can import and use storage vendor specific cloning templates for the source template 221 and/or destination template 241.

In the example of FIG. 2, through implementing methods laid out in destination template 241 for a VHDX file, destination writer 240 consults a block allocation table in the new destination vdisk file 254 to find the file offset for the destination. For simplicity, the file offsets in the destination vdisk file 254 can be arranged contiguously. This process is repeated for each of the extents present in the VMDK. In other aspects, rather than performing clone operations, the storage server can copy the data and create a completely separate destination vdisk that does not share data blocks with the source vdisk.

Figure 3:
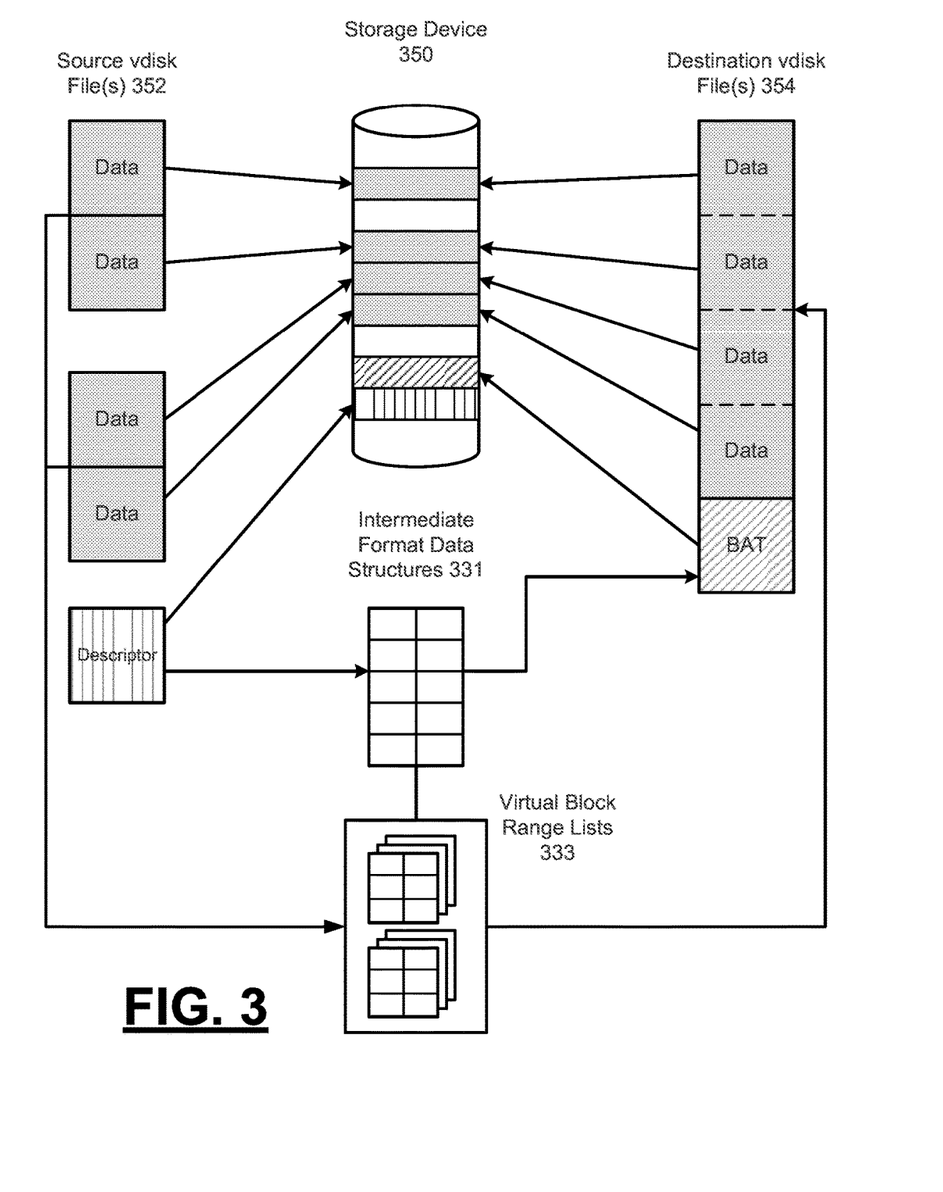
FIG. 3 illustrates relationships between virtual disks, a storage device, and intermediate format data structures, in accordance with some aspects.

FIG. 3 illustrates relationships between virtual disks, a storage device, and intermediate format data structures, in accordance with some aspects. Continuing the example of FIG. 2, source vdisk files 352 can be in a VMDK format and include two extent files and a descriptor file, and destination vdisk file 354 can be a single VHDX file including the data payload and a block allocation table. For the sake of simplicity, the data blocks can be arranged in the VHDX file to be contiguous.

On creating the destination vdisk file 354, the storage server can allocate space on storage device 350 for parts of the vdisk other than the data payload such as a block allocation table (BAT), header, logs, and metadata for the virtual disk. As a result of the clone operations that the storage system performs, the data in the resulting destination vdisk file 354 is identical to the data in the source vdisk files 352. Therefore, the virtual disk converter has created a destination virtual disk that is functionally the same as the source virtual disk without copying any of the data of the source virtual disk. The storage server and file system of storage device 350 can handle subsequent changes to either the source or destination virtual disks. In some aspects, the source vdisk files 352 are removed the file system after conversion, although intermediate format data structures 331 creates from the source vdisk files 352 may be retained.

In one example, intermediate format data structures 331 can represent a virtual disk with the following metadata:

| | |
|---|---|
| Size | Size of the virtual disk |
| Path | Path to the virtual disk representation on the storage system (either a LUN or file) |
| IsSAN | If true, the virtual disk lies on a SAN LUN |
| VirtualBlockSize | Block size of the virtual disk |
| StorageSystemBlockSize | Block size of the storage system. |
| VirtualDiskType | Type of the original virtual disk (VHD, VHDX, etc.) |

| | |
|---|---|
| IsDynamic | Indicates whether the original virtual disk is fully allocated or dynamically growing |
| List<VirtualBlockRangeFilePart> | All file parts of the virtual disk and block ranges describing virtual disk layout on the storage system |

The virtual block range file part includes block ranges from individual source virtual disk file(s). In the example of FIG. 3, there are two extent files, hence there are two entries for the VirtualBlockRangeFilePart, each entry representing block ranges from the source disk in the format:

| | |
|---|---|
| FilePartPath | Path to the virtual disk representation on the storage system |
| List<VirtualBlockRange> | Block ranges describing virtual disk layout on the storage system |

The virtual block range lists 333 included in the intermediate data structures 331 can include:

| | |
|---|---|
| VirtualStart | Starting logical block address (LBA) in VirtualBlockSize units |
| StorageSystemStart | Starting LBA in StorageSystemBlockSize units |
| Size | LBA size of in VirtualBlockSize units |

In some aspects, the virtual machine conversion server can include the intermediate format data structures 331 in a common virtual machine data structure including the name of the virtual machine, number of CPUs, memory size, and lists of each virtual disk and network card.

Before sending the clone requests to the storage server, the virtual disk converter can first ensure the constructed clone requests are valid. Since the clone operation is a sub-file clone, the storage server can impose several restrictions to the clone ranges to be followed or the clone will fail. First, the clone ranges should be aligned, which should always be true in this example because the VMDK flat files start at offset 0 and the VHDX data blocks start at a 1 MB boundary. Second, the clone ranges should also conform to the size restrictions enforced by the storage server (i.e., maximum size per range and maximum size per request). If the ranges do not meet these size requirements, they can be automatically broken down into multiple clone requests.

Methodology

Figure 4:
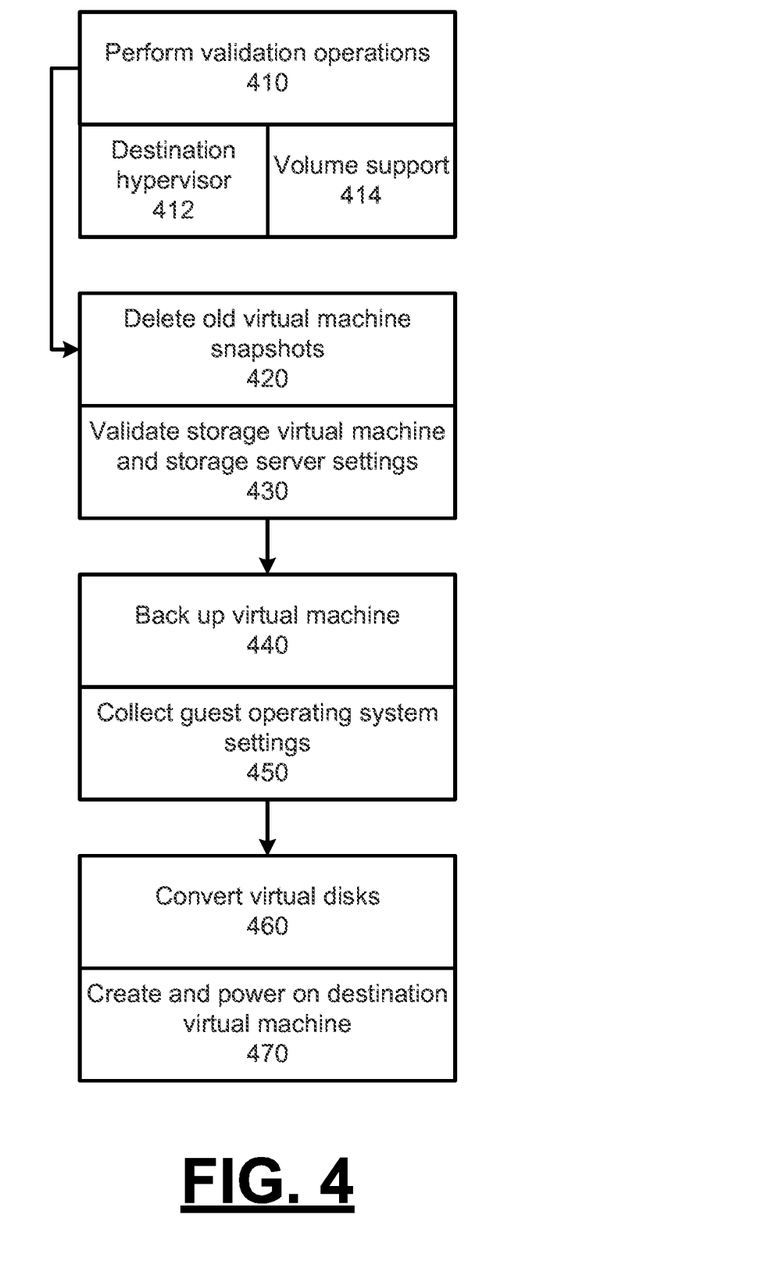
FIG. 4 illustrates an example method for migrating virtual machines.
Figure 5:
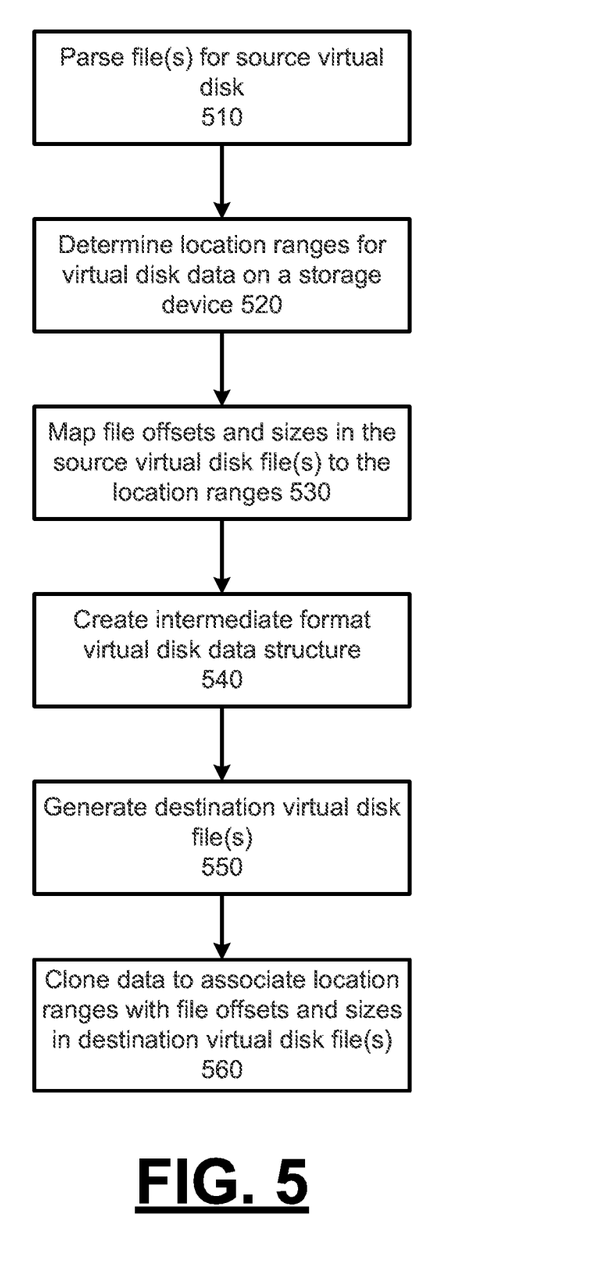
FIG. 5 illustrates an example method for using an intermediate virtual disk format for virtual disk conversion.

FIG. 4 illustrates an example method for migrating virtual machines. FIG. 5 illustrates an example method for using an intermediate virtual disk format for virtual disk conversion. While operations of the methods are described below as being performed by specific components, modules or systems of the virtual machine conversion system 100, it will be appreciated that these operations need not necessarily be performed by the specific components identified, and could be performed by a variety of components and modules, potentially distributed over a number of machines. Accordingly, references may be made to elements of system 100 for the purpose of illustrating suitable components or elements for performing a step or sub step being described. Alternatively, at least certain ones of the variety of components and modules described in system 100 can be arranged within a single hardware, software, or firmware component. It will also be appreciated that some of the steps of this method may be performed in parallel or in a different order than illustrated.

When a user requests a virtual machine conversion, such as by invoking a cmdlet on a virtual machine conversion server, the server can return a job ID to the user and perform operations in the background to convert the source virtual machine to the destination format. Depending on the type of source hypervisor, the virtual machine conversion server can perform some or all of the operations illustrated in FIG. 4. In addition, the sequence of operations can be altered to suit the type of source or destination hypervisors if necessary.

In some aspects, the virtual machine conversion server performs validation operations when the conversion job begins (410). Validating the destination hypervisor can include operations such as checking if the destination hypervisor is healthy (i.e., no hardware or software faults that would interfere with the conversion process) and checking if the destination hypervisor is of a type that the virtual machine conversion server can support (412). For example, the virtual machine conversion server can check whether a destination template exists to create a new virtual disk in the destination hypervisor's format. If a proper destination template does not exist, the virtual machine conversion server can return an error message to the user who created the conversion job.

In addition to validating the destination hypervisor, virtual machine conversion server can determine whether the source virtual disk on the storage device is properly set up and the conversion job is possible. For example, in order to use sub-file cloning operations, the source virtual disk and the destination location of the destination virtual disk should be on the same volume (414).

The virtual machine conversion server can check if background clone operations are active. Virtual machine conversion server can create a snapshot of the source virtual machine files, including any virtual disks associated with the source virtual machine, after the background clone operations are completed. Virtual machine files can include files such as logs, the state of the VM BIOS, memory paging files, snapshot metadata, snapshot state files, and various configuration files. Virtual machine conversion server can also delete old, previously created snapshots of the source virtual machine (420). In some aspects, the virtual disk converter only converts virtual disks if there are no old VM snapshots left over. If there are other VM snapshots, the conversion operation can stop and provide an error message to the user who initiated the conversion job. The virtual machine conversion server can further validate virtual server settings such as NFS server and CIFS server settings on the storage server (430).

Once the validation operations are completed, virtual machine conversion server backs up the source virtual machine (440). In some aspects, virtual machine conversion server can back up the VM using a cloning process on the storage server. The virtual machine conversion server can also collect settings for the guest operating system (GOS) configured to run on the virtual machine (450). Virtual machine conversion server can copy scripts to the GOS and run any required operations for the conversion on the GOS (e.g., uninstall hypervisor-specific tools, setup autorun, etc.).

Virtual disk converter can then convert any virtual disks from the source hypervisor format to the destination hypervisor format using an intermediate format (460). In some examples, a virtual machine has one virtual disk that gets converted to the destination format. In other examples, a virtual machine can have more than one virtual disk, each of which the virtual disk converter converts to the destination format.

Virtual machine conversion server creates a destination VM using the source VM settings (e.g., number of CPUs, number of NICs, memory size, etc.), assigns the new converted vdisks to the destination VM, and powers on the destination VM (470). When the destination VM is started, it reconfigures itself using the saved source GOS info and scripts. In some aspects, the source VM is restored back to its original state after the cloned destination VM is operational. Virtual machine conversion server can restore the source VM using the backup snapshot.

It is important to consider the role of virtual disks as part of the virtual machine. Even when the data is perfectly replicated after a conversion, a new virtual machine is not guaranteed to boot when the virtual disk is attached. For example, VMWare attaches boot virtual disks using SCSI by default, whereas Hyper-V is only able to boot from IDE attached virtual disks (Gen2 Hyper-V VMs are able to boot from SCSI disks). Converting a virtual disk from VMDK to VHDX therefore also converts the disk from a SCSI disk to an IDE disk without making any changes to the disk structure or data contained within the disk. For most operating systems, this change is handled and is ultimately transparent to the user of the virtual machine. However, virtual machines running some operating systems that undergo this conversion may not boot if left unmodified after conversion. In these cases, virtual machine conversion server can include an option specifically targeted to VMs with this condition. When this option is specified, virtual machine conversion server injects the required IDE drivers into the converted VHDX virtual disk before booting so that the virtual disk can boot normally.

As part of converting a virtual machine or as a stand-alone process (e.g., a user can invoke a separate virtual disk conversion cmdlet), a virtual disk converter can create a destination virtual disk in a source virtual disk in a different format. With reference to an example of FIG. 5, a virtual disk converter, such as virtual disk converter 112 as described with FIG. 1, parses files for a source virtual disk in order to convert the source virtual disk in a source format to a destination virtual disk in a new format (510). Using a template or a set of methods corresponding to the format of the source virtual disk, the virtual disk converter can determine location ranges for the virtual disk's data on a storage device or set of storage devices such as a RAID array (520). In some examples, the location ranges are logical block addresses on the storage device and the size of the data.

The virtual disk converter can then map file offsets and sizes from the source virtual disk files to the location ranges on the storage device (530). The virtual disk converter creates an intermediate format virtual disk data structure that stores these mappings along with other metadata about the virtual disk such as the size of the virtual disk, block sizes, and whether the original virtual disk is fully allocated or dynamically growing (540).

Using a destination template or set of methods corresponding to the format of the destination virtual disk, the virtual disk converter can generate files for the destination virtual disk (550). The virtual disk converter can then instruct a storage server to clone the data location ranges identified in the intermediate data structure into the files for the destination virtual disk (560). The destination virtual disk should then be in a format for a different type of hypervisor and virtual machine and contain the same data as the source virtual disk.

Computer System

Figure 6:
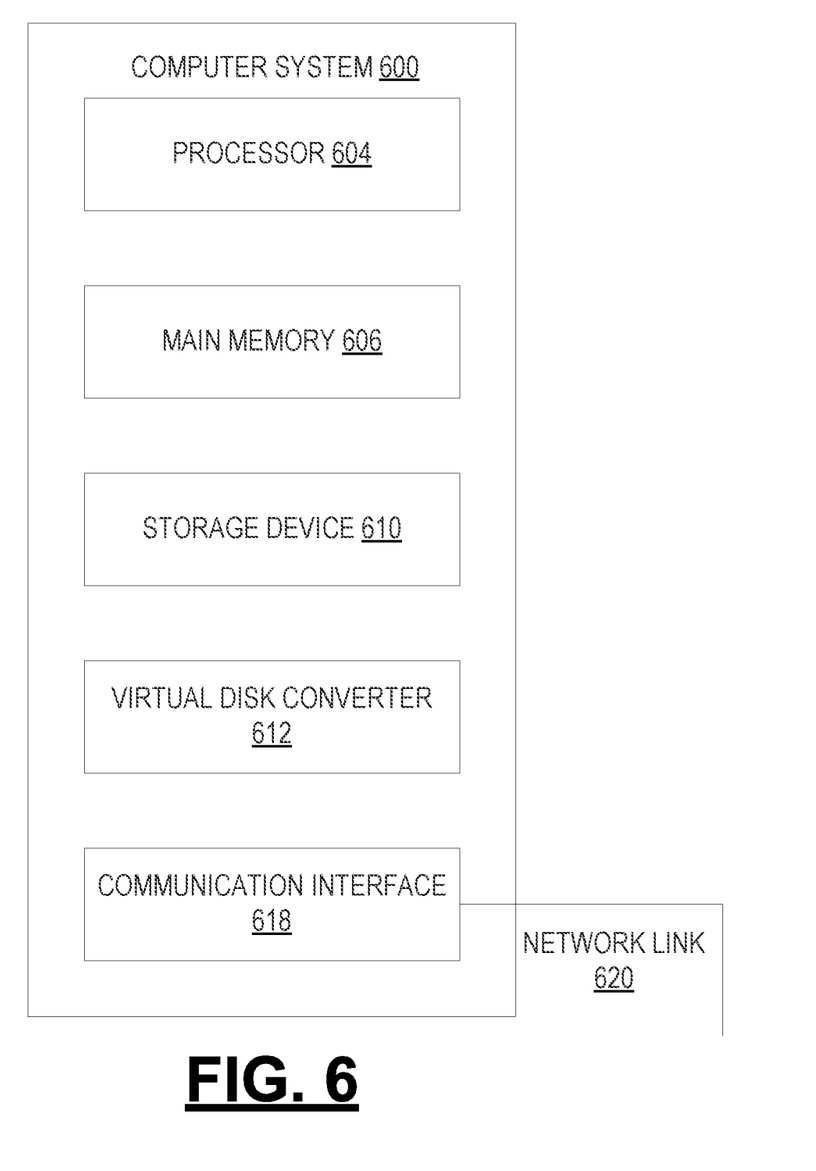
FIG. 6 is a block diagram that illustrates a computer system upon which aspects described herein may be implemented.

FIG. 6 is a block diagram that illustrates a computer system upon which aspects described herein may be implemented. For example, in the context of FIG. 1, virtual machine conversion system 100 may be implemented using one or more servers such as described by FIG. 6.

In an aspect, computer system 600 includes processor 604, memory 606 (including non-transitory memory), storage device 610, and communication interface 618. Computer system 600 includes at least one processor 604 for processing information. Computer system 600 also includes the main memory 606, such as a random access memory (RAM) or other dynamic storage device, for storing information and instructions to be executed by processor 604. Main memory 606 also may be used for storing temporary variables or other intermediate information during execution of instructions to be executed by processor 604. Computer system 600 may also include a read only memory (ROM) or other static storage device for storing static information and instructions for processor 604. The storage device 610, such as a magnetic disk or optical disk, is provided for storing information and instructions. In addition, computer system 600 can contain a virtual disk converter 612, which may include conversion logic for requesting or carrying out any of the functions of virtual disk conversion. The communication interface 618 may enable the computer system 600 to communicate with one or more networks through use of the network link 620 and any one of a number of well-known transfer protocols (e.g., Hypertext Transfer Protocol (HTTP)). Examples of networks include a local area network (LAN), a wide area network (WAN), the Internet, mobile telephone networks, Plain Old Telephone Service (POTS) networks, and wireless data networks (e.g., WiFi and WiMax networks).

Examples described herein are related to the use of computer system 600 for implementing the techniques described herein. According to one aspect, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative aspects, hard-wired circuitry may be used in place of or in combination with software instructions to implement aspects described herein. Thus, aspects described are not limited to any specific combination of hardware circuitry and software.

Although illustrative aspects have been described in detail herein with reference to the accompanying drawings, variations to specific examples and details are encompassed by this disclosure. It is intended that the scope of examples described herein be defined by claims and their equivalents. Furthermore, it is contemplated that a particular feature described, either individually or as part of an aspect, can be combined with other individually described features, or parts of other aspects. Thus, absence of describing combinations should not preclude the inventor(s) from claiming rights to such combinations.

What is claimed is:

1. A virtual disk conversion system comprising:
a memory resource to store instructions; and
one or more processors using the instructions stored in the memory resource to perform operations including:
determining, from at least one source file that represents a first virtual disk in a first format, one or more location ranges for data on a storage device;

generating an intermediate virtual disk data structure that includes the one or more location ranges for the data on the storage device;
using the intermediate virtual disk data structure to associate data at the one or more location ranges with at least one destination file on the storage device that represents a second virtual disk in a second format; and
using a plurality of virtual disk templates and the intermediate virtual disk data structure to associate the one or more location ranges with a plurality of new virtual disks in a plurality of different virtual disk formats.

2. The system of claim 1, wherein generating the intermediate virtual disk data structure includes using a first template to:
parse the at least one source file that represents the first virtual disk;
map file offsets and sizes in the at least one source file to the one or more location ranges; and
store additional metadata for the first virtual disk in the intermediate virtual disk data structure.

3. The system of claim 2, wherein determining the one or more location ranges for the data on the storage device uses the first template to parse the at least one source file that represents the first virtual disk.

4. The system of claim 2, wherein parsing the at least one source file includes identifying used portions of the at least one source file and mapping the file offsets and sizes only for the used portions.

5. The system of claim 1, further comprising instructions to perform operations including:
using a second template and additional metadata from the intermediate virtual disk data structure to generate the at least one destination file on the storage device; and
performing one or more data cloning operations to associate the one or more location ranges with the at least one destination file without copying data located at the one or more location ranges.

6. The system of claim 1, wherein at least some of the plurality of virtual disk templates are provided by respective vendors of the first format and the second format.

7. The system of claim 1, wherein the intermediate virtual disk data structure is stored as part of a disaster recovery plan and used to associate the data at the one or more location ranges with the at least one destination file on the storage device in response to the disaster recovery plan.

8. The system of claim 1, wherein each of the one or more location ranges includes a logical block address on the storage device and a data size.

9. The system of claim 1, wherein the storage device comprises a plurality of physical storage media.

10. A method of converting virtual machine disks, the method being implemented by one or more processors and comprising:
determining, from at least one source file that represents a first virtual disk in a first format, one or more location ranges for data on a storage device;
generating an intermediate virtual disk data structure that includes the one or more location ranges for the data on the storage device; and
using the intermediate virtual disk data structure to associate data at the one or more location ranges with at least one destination file on the storage device that represents a second virtual disk in a second format; and
using a plurality of virtual disk templates and the intermediate virtual disk data structure to associate the one or more location ranges with a plurality of new virtual disks in a plurality of different virtual disk formats.

11. The method of claim 10, wherein generating the intermediate virtual disk data structure includes using a first template to:
parse the at least one source file that represents the first virtual disk;
map file offsets and sizes in the at least one source file to the one or more location ranges; and
store additional metadata for the first virtual disk in the intermediate virtual disk data structure.

12. The method of claim 11, wherein determining the one or more location ranges for the data on the storage device uses the first template to parse the at least one source file that represents the first virtual disk.

13. The method of claim 11, wherein parsing the at least one source file includes identifying used portions of the at least one source file and mapping the file offsets and sizes only for the used portions.

14. The method of claim 10, further comprising:
using a second template and additional metadata from the intermediate virtual disk data structure to generate the at least one destination file on the storage device; and
performing one or more data cloning operations to associate the one or more location ranges with the at least one destination file without copying data located at the one or more location ranges.

15. The method of claim 10, wherein at least some of the plurality of virtual disk templates are provided by respective vendors of the first format and the second format.

16. The method of claim 10, wherein the intermediate virtual disk data structure is stored as part of a disaster recovery plan and used to associate the data at the one or more location ranges with the at least one destination file on the storage device in response to the disaster recovery plan.

17. The method of claim 10, wherein each of the one or more location ranges includes a logical block address on the storage device and a data size.

18. A non-transitory computer-readable medium that stores instructions, executable by one or more processors, to cause the one or more processors to perform operations that comprise:
determining, from at least one source file that represents a first virtual disk in a first format, one or more location ranges for data on a storage device;
generating an intermediate virtual disk data structure that includes the one or more location ranges for the data on the storage device;
using the intermediate virtual disk data structure to associate data at the one or more location ranges with at least one destination file on the storage device that represents a second virtual disk in a second format; and
using a plurality of virtual disk templates and the intermediate virtual disk data structure to associate the one or more location ranges with a plurality of new virtual disks in a plurality of different virtual disk formats.

19. The non-transitory computer-readable medium of claim 18, wherein the intermediate virtual disk data structure is stored as part of a disaster recovery plan and used to associate the data at the one or more location ranges with the at least one destination file on the storage device in response to the disaster recovery plan.

20. The non-transitory computer-readable medium of claim 18, wherein at least some of the plurality of virtual disk templates are provided by respective vendors of the first format and the second format.

21. A method of converting virtual machine disks, the method being implemented by one or more processors and comprising:

determining, from at least one source file that represents a first virtual disk in a first format, one or more location ranges for data on a storage device;

generating an intermediate virtual disk data structure that includes the one or more location ranges for the data on the storage device; and     using the intermediate virtual disk data structure to associate data at the one or more location ranges with at least one destination file on the storage device that represents a second virtual disk in a second format; wherein the intermediate virtual disk data structure is stored as part of a disaster recovery plan and used to associate the data at the one or more location ranges with the at least one destination file on the storage device in response to the disaster recovery plan.

\* \* \* \* \*